M. FISET.
Furniture-Caster.
No. 223,846. Patented Jan. 27, 1880.
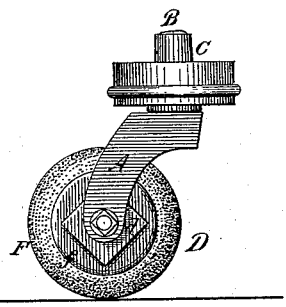
Fig. 1.
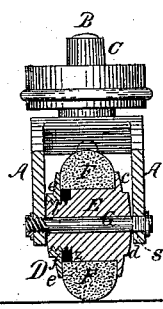 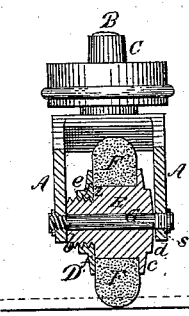
Fig. 2. Fig. 3.
 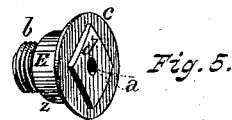
Fig. 4. Fig. 5.
Witnesses.
Charles Selkirk.
Robert H. Gillson
Michel Fiset
Inventor.
by his Atty
Alex. Selkirk

UNITED STATES PATENT OFFICE.

MICHEL FISET, OF ALBANY, NEW YORK.

FURNITURE-CASTER.

SPECIFICATION forming part of Letters Patent No. 223,846, dated January 27, 1880.

Application filed August 29, 1879.

*To all whom it may concern:*

Be it known that I, MICHEL FISET, of the city and county of Albany, and State of New York, have invented certain new and useful Improvements in Casters for Tables, &c., of which the following is a specification.

The invention relates to casters having expansive wheels the diameters of which may be variously enlarged or reduced, as may be desired.

The object of my invention is to provide in a wheel-caster a wheel having an elastic rim supported between clamping-flanges from a hub attached to one of said flanges, with the other flange adapted to be set nearer to or farther from the fixed flange, so that the diameter of the said elastic rim may be increased or diminished; and, further, to secure the pintle on which the wheel revolves from turning in the arms of the bracket of the caster; and also to maintain the hub between the arms at the same uniform length, whether the rim of the wheel is increased or diminished in its diameter.

The invention consists in the combination, with an elastic rim, of a solid hub pierced centrally, and provided at one end with a screw-threaded rib and at the other end with a flange having a squared or irregular outer projection, or equivalent outer recesses, for receiving a wrench and a flanged nut, whereby the elastic rim will be supported from the hub, and the flanges will operate, by their compression of the elastic rim, to affect the diameter of the same.

It also consists in a centrally-pierced flanged hub of a wheel having an elastic rim, a screw-threaded nib made with one end of the hub, a flanged nut, and a pintle fixed from turning in the bracket-arms, whereby the length of the hub between the arms will be unchanged by adjustment, and the pintle be held from turning in the arms, while the wheel will be free to revolve.

In the accompanying drawings, in which similar letters of reference indicate like parts, Figure 1 represents a side elevation of my improved caster. Fig. 2 is a sectional elevation of the same, illustrating the wheel in its smallest diameter. Fig. 3 is a sectional elevation, illustrating the wheel in its largest diameter. Fig. 4 is a perspective view of the flanged nut, and Fig. 5 is a perspective view of the flanged hub with its squared projection and screw-threaded nib.

The bracket-arms A A and swivel-pintle B and swivel-sleeve C are made in any form practiced by the trade.

The wheel D is composed of three sections. The first section consists of the solid hub E, centrally pierced with the circular bore $a$, and provided at one end with a screw-threaded nib, $b$, and at the opposite end with the flange $c$, and a squared projection, $d$, as shown in Figs. 2, 3, and 5. The length of this section between the outer end of the screw-threaded nib and the outer face side surface of the squared projection is to be made equal to the distance between arms A A of the bracket. The second section consists of the nut $e$, made solid with the flange $f$, and provided with a screw-threaded hole, $x$, corresponding with the diameter of the screw-threaded nib $b$ of the hub-section. The aggregate thickness of the nut and flange of this second section is considerably less than the length of the screw-threaded nib $b$ from its outer end to the shoulder at the hub proper. The third section consists of an elastic rim, F, made of rubber or other elastic material which, when compressed in one direction will expand in another direction.

In uniting these three sections for forming the wheel the elastic rim F, which is made with a greater thickness from side to side than the length of the hub E from the flange $c$ to the shoulder $z$, is to be slipped on the hub E with one side against the flange $c$, as shown in Fig. 2. The bore of the rubber rim is preferably made with a smaller diameter than the diameter of the hub, so that the said rim will hug tightly the periphery of said hub. The flanged nut is then screwed on the nib $b$ of the hub by means of proper and suitable instruments until the outer face of the nut is even or on the same plane with the outer face end of nib $b$ of the hub, as shown in Fig. 2.

The pintle G is made in the form of a cylinder in its main portion contained within the bore $a$ of hub E, and its head end is provided with a squared portion, $s$, which fits a correspondingly-squared hole made in the lower end of one of the bracket-arms A, as shown in Figs. 2 and 3, which squared portion prevents the pintle from turning in the arms A A of the bracket. The opposite end of said pintle passes through a hole made in the opposite side arm A, and may be secured by a nut, or by riveting, or as otherwise practiced, as may be selected.

When the several parts are united, as shown in Fig. 2, the wheel will be at its smallest diameter, with the length of the central portion filling the space between arms A A, as shown in said figure, and the wheel free to revolve on said pintle, while the pintle will be held from revolving in the arms of the bracket. When the flanged nut $e\ f$ is screwed on nib $b$ of the hub up to shoulder $z$ a compression of the elastic rim will be effected and the diameter of said rim will be enlarged, as shown in Fig. 3. In this condition the length of the hub, together with that of the nib $b$ and thickness of the flange $c$ and squared projection $d$, will be unchanged, and will fill the space between the arms A A, the same as before such compression of the rim was effected. When the flanged nut is screwed on the nib of the hub to a less distance than shown in Fig. 3 the diameter of the rim of the wheel will be lessened.

It will thus be seen that by my improvement the diameter of the wheel may be variously increased or lessened; and that when a number of these wheels—say four—are employed with the legs of a table, chair, or bedstead, where the legs are of unequal length to a slight extent, or the floor is uneven, the diameter of the said wheels may be variously altered to secure a firm and full bearing of the legs, through their respective caster-wheels on the floor; and that in all cases the length of the wheels from side to side at their hubs will fill the distance between the arms of the bracket of the caster, while the wheels will revolve on their respective pintles, though held from turning in their arms.

I am aware that wheels having elastic rims have heretofore been used. Such wheels were made with two sectional flanged rims of metal connected to sectional central hubs by a web, and secured together by three or more screws passing through the web of one section and screwing into the web of the other section, and thus clamping the rubber rim between dovetailed or beveled flanges made with the metallic rim. Such a form of construction of parts I do not claim as forming any part of my invention; neither do I claim, broadly, the elastic rim, as with such a form of construction of parts the advantageous results attending my invention could not be secured.

What I claim, and desire to secure by Letters Patent, is—

In a caster-wheel, the combination, with an elastic rim, F, of the solid hub E, having a central bore, and provided at one end with a flange, $c$, and a squared projection, $d$, and at its other end with a screw-threaded nib, $b$, and the flanged nut $e\ f$, substantially as and for the purpose set forth.

MICHEL FISET.

Witnesses:
ALEX. SELKIRK,
PHILIP O. PRATT.